Figure 3:
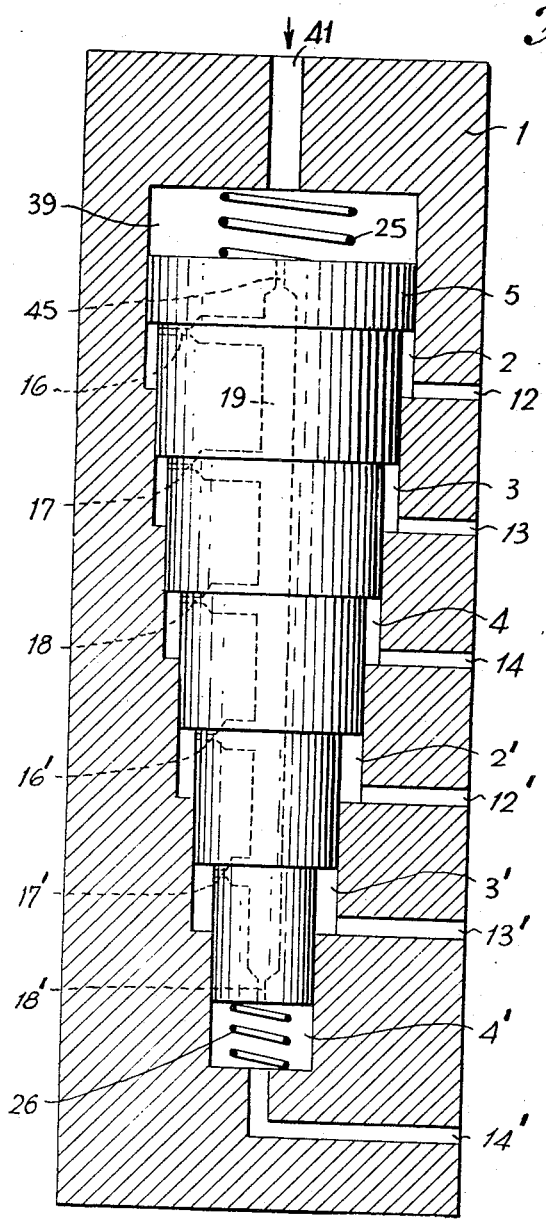

June 27, 1967  J. W. L. PETTY  3,327,545
DAMPING DEVICE FOR HYDRAULIC ACTUATORS
Filed July 28, 1965  5 Sheets-Sheet 1
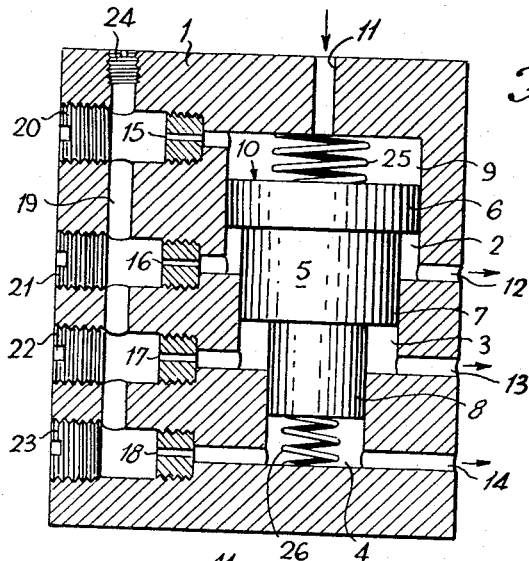
Fig.1.
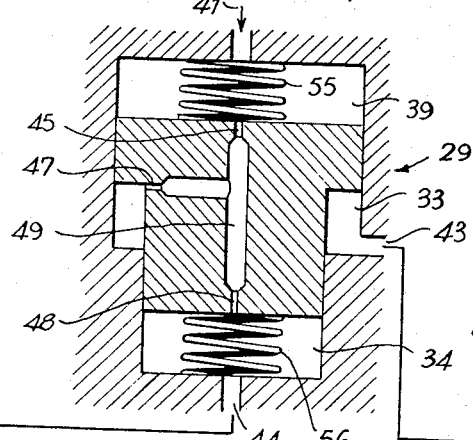
Fig.2.
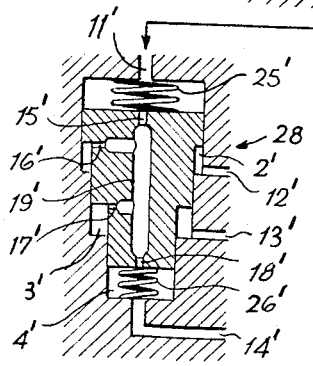
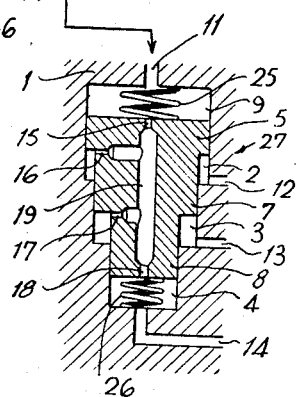

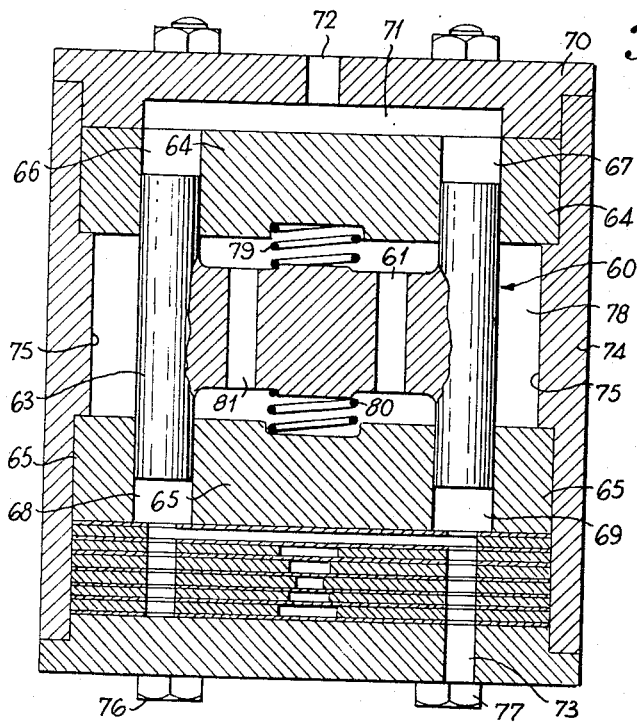
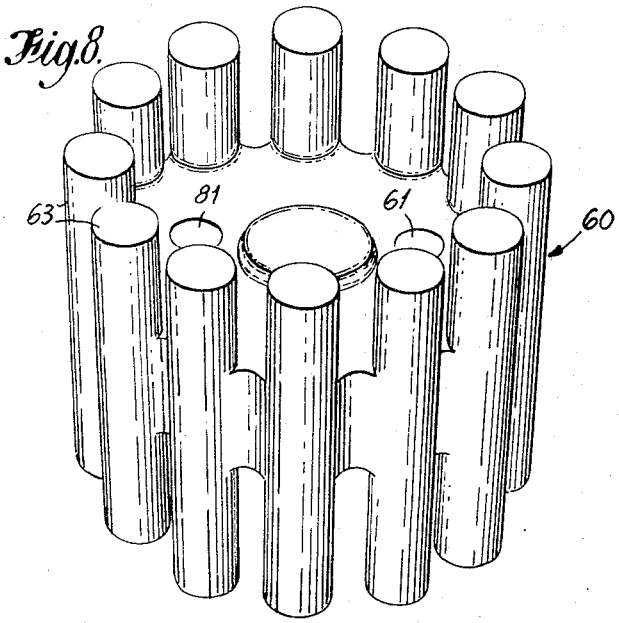

June 27, 1967 J. W. L. PETTY 3,327,545
DAMPING DEVICE FOR HYDRAULIC ACTUATORS
Filed July 28, 1965 5 Sheets-Sheet 5

United States Patent Office 3,327,545
Patented June 27, 1967

3,327,545
DAMPING DEVICE FOR HYDRAULIC ACTUATORS
John William Ledward Petty, Haywards Heath, England, assignor to National Research Development Corporation, London, England, a British corporation
Filed July 28, 1965, Ser. No. 475,395
Claims priority, application Great Britain, Aug. 7, 1964, 32,183/64
11 Claims. (Cl. 74—190.5)

This invention relates to damping units for use in conjunction with a plurality of hydraulic actuators supplied in parallel with fluid under pressure from a common source, the pressure being variable to operate the actuators.

It was conceived to solve certain problems encountered with transmission units of the so-called "toroidal race rolling friction" type wherein rollers provide a driving connection between facing toroidal surfaces of an input disc and an output disc, the rollers being mounted for rotation about axes which extend in a general radial direction from, and normally intersect, the rotational axis common to the input and output discs (hereinafter called the "main axis"). The invention will be described in relation to its use with such transmission units but the scope of the invention extends to other uses involving analogous problems.

In a transmission unit of the type described, changes of ratio are obtained by changing the angle (hereinafter called the "ratio angle"), between the rotational axis of each roller and the main axis. For convenience of description the ratio angle is considered as zero when the rotational axis of a roller is normal to the main axis. It is impracticable to change the ratio angles of the rollers by direct action because the forces required are too great and it is known to effect changes of ratio angle by causing the rollers to steer themselves along helical paths along the toroidal surfaces of the discs until a desired ratio angle is obtained. The condition necessary for a roller to steer itself into a different ratio angle in this way is that the roller rotational axis should cease to intersect the main axis.

This may be brought about by mounting the roller so that it can be moved in a mode which provides at least a substantial component of motion in the form of bodily translation of the roller substantially along the line of the axis (hereinafter called the "ratio angle axis"), about which ratio angle changes are made. Motion of this form is hereinafter called "tangential shift displacement."

With a roller mounted in this way the reaction forces to which it is subjected in the course of transmitting torque from the input disc to the output disc are applied to the means by which ratio change motions of the roller are controlled and it is known to make use of this feature to ensure that the rollers all bear equal shares of the load by individually adjusting their ratio angles until the torque reaction forces to which each one is subjected is in balance with the control force applied to the roller mounting to maintain it in the equilibrium position or to initiate a change of ratio.

A typical example of a transmission unit having this type of roller mounting, is described in copending application Ser. No. 362,521, now United States Patent No. 3,276,279, wherein fluid pressure operated actuators position the rollers substantially along the lines of their ratio angle axes these actuators being supplied with fluid at the same pressure from a common source the delivery pressure of which may be varied to initiate changes of ratio on the part of the transmission unit. Each roller will undergo a tangential shift displacement if the torque reaction applied to it is not in balance with the fluid pressure in the associated actuator and the geometry is such that the change of ratio angle initiated by such displacement is in the direction will change the torque reaction applied to the roller in the sense tending to equate that torque reaction with the force supplied by the actuator. If all the actuators, being supplied with the same pressure from the common source, have the same effective piston area the rollers will automatically assume ratio angles at which they bear equal shares of the torque transmitted by the transmission unit.

Tangential shift displacements of the rollers are described above as being *substantially* along the line of the ratio angle axis because the ratio angle axes of the rollers may be inclined to the plane of the circle forming the locus of the generator circle of the torus of which the toroidal surfaces of the input and output discs form parts. This locus is hereinafter called the "torus centre circle." Such inclination is in a plan tangential to the torus centre circle at the roller centre, the latter being defined as a point on the roller rotational axis between two planes respectively containing the outer margins of the running track on the edges of the roller which makes contact with the toroidal surfaces of the discs and the inclination is hereinafter referred to as a "camber angle."

With camber angle geometry the rotational axis of a roller, when the roller rotates about its ratio angle axis, has a component of rotation about the roller centre and in the plane of the torus centre circle so that the roller, having been subjected to a tangential shift displacement, causing its rotational axis to move to a position in which it does not intersect the main axis, tends to restore its rotational axis to the equilibrium attitude of intersection of the main axis as the roller rotates about the ratio angle axis. When equilibrium has been restored the tangential shift displacement remains. The roller is confined between the disc surfaces, however, so that tangential shift displacements must take place in the plane of the torus centre circle. Therefore, when camber angle is provided, the direction of tangential shift is only approximately along the line of the ratio angle axis.

When there is no camber angle provided, which can be considered as the zero camber angle case, a roller subjected to a tangential shift displacement moving it from the equilibrium position will continue to change its ratio angle until the tangential shift displacement is cancelled by a reverse tangential shift displacement. This can be brought about by a screw or cam device between the actuator and the roller carrier which operates to displace these two items relative to one another when the roller rotates around its ratio axis. Alternatively the restoration of the roller to its equilibrium attitude can be entrusted to an external servo ratio control system designed to adjust the pressure delivered to the roller ratio control actuator, in response to some measured parameter of the system, e.g., input speed or the actual ratio attitude of a roller.

In a zero camber angle arrangement the direction of tangential shift displacement lies along the ratio angle axis of the roller.

A transmission unit of the type herein described, which is well suited for use with camber angle geometry is described in the specification accompanying copending application Ser. No. 451,421.

It has been found that transmission units where tangential shift motions of the rollers are controlled by individual actuators all supplied with pressurised fluid at the same pressure from a common source are, in certain circumstances, prone to oscillation of the type wherein a roller may undergo a tangential shift displacement and the resulting change of ratio will give rise to a corrective tangential shift displacement which overshoots the equilibrium condition leading to a ratio angle change in the opposite direction followed by a further corrective tangential shift displacement which again overshoots the equilibrium position and this process may build up to an amplitude of oscillation sufficiently violent to wreck the transmission unit.

Oscillation of this type may be prevented by the introduction of damping in the form of fluid flow restrictors in the fluid passages supplying the actuators but measures of this type damp also the response of the transmission unit as a whole to pressure changes introduced at the common pressurised fluid source for the purpose of changing the ratio of the transmission unit. Also the response of the control system to sudden changes of load is damped and this cannot be tolerated in installations where a servo control system is required to respond quickly to a sudden change of load—either by changing the ratio to hold, say the input torque, constant, or by changing the control pressure to hold the ratio constant—according to the performance criteria required for the installation.

The disadvantage of damping which delays the response of the transmission unit and its control system as a whole is most keenly felt where a fluid pressure operated actuator is used to provide the end load force for squeezing the discs together into driving engagement with the rollers interconnecting them. This force should be proportional to the sum of the input torque and the output torque which sum is in turn proportional to the torque reaction to which the rollers are subjected. When the rollers are in equilibrium this torque reaction is exactly balanced by the control pressure applied to the roller positioning actuators and this control pressure provides a convenient source from which to supply the end load actuator. A sudden rise in load applied to such an arrangement will result either in a fall in ratio (output speed/input speed) which will tend to restore the input torque to its former value, or, after an initial brief fall in ratio sensed by a control element of the servo ratio control system the roller positioning control pressure will be raised to restore the ratio to its former value. In either case the torque reaction at the rollers and the roller-positioning actuator pressure will tend to remain in balance and the end load force will be maintained in the desired relationship with the torque reaction, in the first instance by variation of the latter and in the second instance by variation of the former.

With restrictors in the fluid paths to and from the roller positioning actuators however a sudden rise in the torque reaction at the rollers cannot produce sudden tangential shift displacements of the rollers so that they cannot undergo a sudden fall of ratio to relieve themselves of their torque reaction load or to initiate a rise in the control pressure. The end load therefore remains unaltered causing the rollers to slip on their tracks on the discs, potentially with disastrous results.

It is unlikely that oscillations will take place of the type in which the transmission unit as a whole changes ratio up and down with all the rollers moving in unison because the servo control system can readily be designed to react to these changes of ratio by varying the control pressure to resist them. This need not involve damping such as would delay the rise in the control pressure to meet a sudden rise of load and so delay the corresponding rise in the end load necessary to prevent slip between rollers and discs or frustrate a fall in ratio to relieve the rollers of excess load.

The oscillations to be guarded against are those in which a single roller starts to oscillate by itself. If one roller changes ratio so as to change its ratio in one direction, it bears an unequal share of the total torque as compared with the other rollers. For instance, a fall in the torque reaction at one roller causes the torque reaction of the other rollers to rise. The rollers then tend to oscillate out of phase and the servo system cannot resist oscillations of this type.

According to the invention there is provided a damping unit for use with a plurality of fluid-pressure-operated actuators coupled in parallel to a common source of fluid under pressure capable of control, characterised in that the damping unit comprises a plurality of cylinder spaces each adapted for connection to one of the actuators, a piston assembly having mechanically interconnected piston units one movable in each cylinder space so that the effective piston areas of the piston units in their respective cylinder spaces are equal one with another, a common cylinder space adapted for connection to the said common fluid pressure source; displacement means integral with the piston assembly and adapted on movement of the piston assembly to change the volume of the common cylinder space by an amount equal in degree and opposite in sense to the aggregate of the changes which take place within the said plurality of other cylinder spaces as a result of such movements of the piston assembly, resilient means lightly biassing the piston assembly to an intermediate position between the extreme limits of its permissible motion within the cylinder spaces and a fluid connection, comprising a passage restrictive of fluid flow, between each cylinder space and each of the other cylinder spaces.

The common cylinder space and the displacement means may take the form of a number of component cylinder spaces and piston elements but the aggregate effective piston area of such component piston elements should be equal to the aggregate effective piston areas of the pistons associated with the cylinder spaces individual to the said actuators.

The invention will be more readily understood from the following description of certain embodiments thereof illustrated in the accompanying drawings in which:

FIGURE 1 is a cross section of a damping unit for use in a tangential unit having three rollers, FIGURE 2 is a cross section of a compound damping unit for a transmission unit having two groups of three rollers each, FIGURE 3 is a damping unit suitable for a transmission unit having six rollers which may consist of two groups of three rollers each, and FIGURES 4, 5, 6 and 7 illustrate an alternative form of damping unit suitable for a transmission unit having six rollers which may consist of two groups of three rollers each.

In FIGURE 1 a body 1 for the damping unit has three concentric bores providing three cylinder spaces 2, 3 and 4 of different diameters the composite bore being closed at both ends except for fluid passages later described.

A piston assembly 5 is machined to three different diameters to provide elements, 6, 7, and 8 which fit with working clearance within the cylinder spaces 2, 3 and 4 the diameters being chosen so that the effective piston areas of piston elements 6, 7 and 8 within their respective cylinder spaces 2, 3 and 4 are substantially equal one with another. A common cylinder space 9 is provided by the upper part of the bore of cylinder space 2 and the upper face 10 of piston element 6 operates to reduce or increase the volume of common cylinder 9 as piston assembly 5 moves up or down.

Block 1 is provided with a passage 11 leading to cylinder space 9, a passage 12 leading to cylinder space 2, a passage 13 leading to cylinder space 3 and a passage 14 leading to cylinder space 4. Passages 12, 13 and 14 are respectively connected (by ducts not shown) to the roller positioning actuators associated with three rollers providing a driving connection between facing toroidal surfaces one on each of two discs. Passage 11 is connected (by a duct not shown) to a common source of pressurised fluid the pressure of which is adjustable for the purpose of adjusting the ratio of the transmission unit.

Cylinder spaces 9, 2, 3 and 4 are also connected through respective damping orifices 15, 16, 17 and 18 to a common interconnecting gallery 19. The orifices 15, 16, 17 and 18 take the form of interchangeable units, similar to carburettor jets, which are inserted through enlarged holes passing through the gallery 19 from the outside of body 1 the outer ends of these holes being closed by plugs 20, 21, 22 and 23. A plug 24 closes the upper end of gallery 19 which is drilled downwardly from the upper face of body 1.

Piston assembly 5 is biassed to a central position by two weak springs 25 and 26, one at each end.

In the absence of oscillation the rollers respond in unison to changes of torque reaction of control pressure and undergo tangential shift displacements leading to changes of ratio. In the course of these tangential shift displacements the roller positioning actuators draw fluid from, or return fluid to the common fluid supply source.

In the case of fluid being drawn into the individual roller actuators, depressions will occur in cylinder spaces 2, 3 and 4 respectively. If the roller motions are gradual, fluid will flow into spaces 2, 3 and 4 from space 9 collectively via orifice 15 and individually through orifices 16, 17 and 18, and piston assembly 5 will not move. Fluid from the common supply source will flow in through passage 11 to replenish space 9. In the case of fluid being expelled from the individual roller actuators the converse will apply.

If the movements of the rollers are sudden however, there will not be time for adjustment to take place through orifices 15, 16, 17 and 18 and piston assembly 5 will move up or down from its central position which will also equalise the pressures as between space 9 and spaces 2, 3 and 4. If the displacement of the rollers persists one of the springs 25 or 26 (according to the direction in which piston assembly 5 moved) will gradually restore piston assembly 5 to its control position by displacing fluid through orifices 15, 16, 17 and 18.

If a ratio change is to be initiated, or a tangential displacement of the rollers is to be cancelled by a rise in the control pressure applied through passage 11 to cylinder space 9, fluid will flow to the roller actuators via orifice 15 and thence via orifices 16, 17 and 18, spaces 2, 3 and 4, and passages 12, 13 and 14 respectively, provided that the rise of the control pressure is gradual. If the rise of the control pressure is sudden piston assembly 5 will be forced downwards, against light resistance from spring 26, and fluid will be expelled from cylinder spaces 2, 3 and 4 into the roller actuators.

The ability of piston assembly 5 to transmit sudden pressure variations between space 9 and spaces 2, 3 and 4 provides a virtual short circuit of the damping orifices 15, 16, 17 and 18 so long as all the rollers move in unison.

If a roller tends to move independently of the others, however any movement of piston assembly 5 will tend to make the other rollers move in the same sense. In short to make the transmission unit as a whole change ratio.

For instance suppose the roller associated with space 2 for some reason is suddenly subjected to a torque reaction greater than that applied to the other rollers. Its actuator will tend to expel fluid into space 2 to raise the pressure therein. The total of the upward forces on piston assembly 5 will then exceed the downward force due to the control pressure acting on surface 10 and piston assembly 5 will tend to rise. This will result in a reduction in the pressure in spaces 3 and 4 and the rollers associated therewith will tend to move in the same direction as they would if they also had been subjected to an increased torque reaction although in fact these movements will be occasioned by a reduction in roller positioning actuator force rather than an increase in torque reaction force.

If the raised torque reaction at the roller associated with space 2 is sustained it may be assumed that it is due to a structural inaccuracy in the transmission unit and it is required that it should be corrected by a ratio change on the part of that roller individually. This correction will take place subject to a delay, by flow of fluid from space 2 in which the pressure has risen, into spaces 3 and 4 where the pressure has fallen, via orifices 16, 17 and 18. The delay interposed by these orifices is sufficient to damp out any oscillatory behaviour on the part of an individual roller or on the part of the rollers which are different in sense or degree one with another. Any oscillation of the rollers in unison will cause piston assembly 5 to oscillate up and down and the resulting oscillation of the ratio of the transmission unit as a whole will act through the servo control system to produce corrective fluctuations in the pressure applied to surface 10.

FIGURE 2 shows a compound damping unit consisting of two damping units 27 and 28 each similar to that shown in FIGURE 1 and each individually supplied with fluid from a third damping unit 29 similar to that shown in FIGURE 1 but having only two output cylinder spaces, each connected to the common cylinder space of one of the two first mentioned damping units.

Damping units 27 and 28 are identical and only the former and the respects in which it differs from FIGURE 1 will be described, the reference numerals of FIGURE 1 being used for corresponding items.

The only difference between damping unit 27 and that of FIGURE 1 relates to the gallery 19 and the restrictor orifices 15, 16, 17 and 18 which are accommodated in the piston assembly 5 rather than in the body 1. The piston assembly 5 has a central gallery bore 19 branched to the upper ends of the piston units 7 and 8 respectively. The exit orifices 15 and 18 at the top and bottom of the piston assembly 5, leading to common cylinder space 9 and cylinder space 4 respectively are narrowed down to act as restrictors. The branches leading radially outward from gallery bore 19 to cylinder spaces 2 and 3 are similarly narrowed down to act as restrictors.

The arrangement of FIGURE 2 is intended for use with a variable ratio transmission unit of the type described, having two outer discs rotating together and a central disc each side of which is provided with a toroidal surface, one set of rollers providing a driving connection between one outer disc and one surface of the central disc and another set of rollers providing a driving connection between the other outer disc and the other surface of the central disc. If the two outer discs are coupled together to rotate as one, the two sets of rollers provide two transmission paths effectively in parallel with one another and this type of transmission unit is hereinafter referred to as a "parallel double-ended transmission unit."

A parallel double-ended transmission unit may well be subject to out-of-phase oscillatory ratio changes as between one set of rollers as a whole and the other set of rollers as a whole, over and above any tendency for the individual rollers of either set to oscillate out of phase amongst themselves.

The arrangement of FIGURE 2 would have the outlets 12, 13 and 14 of damping unit 27 connected to the actuators of three rollers constituting one set of rollers and would damp out of phase oscillations of those rollers as described in relation to FIGURE 1. Similarly outlets 12', 13', and 14' of damping unit 28 would be connected to the actuators of three rollers constituting the other set of rollers and would damp out of phase oscillations of those rollers.

If the rollers of the set associated with damper unit 27 were to start oscillating in unison without any similar oscillation on the part of the set of rollers associated with damper unit 28, piston assembly 5 would be subjected to a fluctuating pressure in the cylinder spaces 2, 3 and 4 and these fluctuations would be in phase. Piston unit 5 would tend to move up and down in step with the fluctuations and to displace fluid out of or into common cylinder space 9.

This is frustrated by damper 29 which has two underside cylinder spaces 33 and 34 (corresponding to spaces 3 and 4 of damping unit 27), with outlets 43 and 44 leading to the main inlets 11 and 11' of damper units 27 and 28. A common upper side cylinder space 39 is connected by inlet 41 to the main source of pressurized control fluid.

Upward and downward movements of piston unit 5 in damper unit 27 will cause pressure fluctuations in cylinder space 33 of damper unit 29. Unless the fluctuations are very slow piston unit 35 will move up and down and the resulting pressure variations in cylinder space 34 communicated through damper unit 28 to the associated roller set are in such a phase relationship to the oscillations of the set of rollers associated with damper unit 28 that both sets of rollers tend to oscillate in unison. This produces oscillatory changes of ratio of the transmission unit as a whole which react on the servo ratio control system which can readily be designed to counteract such oscillations.

One of phase ratio changes as between the two sets of rollers can only take place to the accompaniment of fluid transfer from cylinder space 33 to cylinder space 34 (or vice versa) and this transfer can only take place through restrictors 47 and 48 and gallery 49 which damp any such fluid transfer and likewise damp any such out of phase ratio changes between roller sets. This does not prevent such changes taking place for purposes of load equalisation between the two halves of the transmission unit but it slows down such changes and prevents any build-up of oscillation.

For normal ratio changes which are sudden due to a shock load or a sudden change of control pressure at inlet 1, all three piston assemblies 35, 5 and 5′ move together in unison and do not affect the transmission of pressure changes as between inlet 41 and the six roller positioning actuators. After the change of ratio has been completed the three piston assemblies slowly restore to their central positions as shown in the drawing under the action of the springs 55, 56; 25, 26; 25′, 26′, fluid passing slowly through the appropriate galleries 49, 19, 19′ via the appropriate restrictors.

The functioning of the damper units is essentially the same whether the roller geometry incorporates a camber angle or not. In the camber angle case a change of ratio is initiated by a tangential shift displacement of a roller and fluid flows into or out of the roller positioning actuator in the process. As the roller changes ratio the camber angle causes the roller rotational axis to revert to the equilibrium attitude where it intersects the main axis and this equilibrium will be achieved with the movable element of the roller positioning actuator displaced in relation to its position before the ratio change was initiated.

The corresponding conditions in the control system are as follows: Suppose a change of ratio is initiated in the control system by a change of pressure, the roller actuator force will be out of balance with the torque reaction and the roller will execute a tangential shift. During the ensuing change of ratio the torque reaction at the roller will change in the direction required to restore balance with the changed control pressure. Once the balance of positioning forces acting on the roller has been upset there is nothing to stop it executing a tangential shift displacement to the full extent of its available motion except that the further it moves the more quickly will the ratio change to restore balance. This will involve some overshoot of the roller from the position corresponding to the equilibrium position fo rthe ratio at which equilibrium will ultimately be established. This overshoot will be corrected during the move towards balance between the positioning forces acting on the roller.

The extent of the overshoot depends upon a number of factors including the speed and extent at and to which the control pressure is changed, the degree of camber angle and the rotational speed of the roller. The last two determine the ratio change sensitivity of the roller. For very slow control pressure changes and very high roller ratio change sensitivity the extent of the roller position overshoot will be very small.

This does not affect the operation of the damper units. For slow flows as between the control pressure source and the roller actuators fluid passes through the retrictors without appreciable movement of the piston assemblies but for quick flows the piston assemblies move in unison and are restored to central positions by the springs when things have settled down.

With zero camber angle geometry when a roller executes a tangential shift displacement from the equilibrium position it will continue to change ratio until it is restored to the initial position from which it started.

That is to say the tangential shift displacement must be cancelled. The process by which this takes place is similar to the overshooting and reversion procedure previously described in relation to the camber angle case in that the roller torque reaction changes as the ratio change falls below (or rises above, as the case may be) the force from the actuator and this causes the roller to retrace its movement to cancel the tangential shift; the roller finally finishes up with the positioning forces in balance at a new ratio attitude but with the roller at some constant central equilibrium position along the line of tangential shift.

There is thus a process closely resembling the process of overshoot and recession as occurs in the camber angle case. In the end there will have been a net flow of fluid into or out of the roller positioning actuators in the camber angle case, when the ratio change has been accomplished whereas there will be no such net flow in the camber angle case but this does affect the working of the damper units. It is nevertheless the case that the zero camber angle geometry results in a greater sensitivity of ratio change response to tangential shift displacement so that fluid flow into and out of the ratio actuators is less than the camber angle case. It may therefore be necessary to increase the damping by narrowing down the restrictors in the damping units, where zero camber angle geometry is used.

In a parallel double-ended transmission unit one may regard the two sets of rollers (generally three rollers per set) as if they were six rollers of a single set in-so-much as any one or more rollers must be restrained, by damping, from executing tangential displacements not shared by the remaining rollers.

A variant of the invention illustrated in FIGURE 3 illustrates this approach to the problem.

In order to emphasise the features common to the arrangements of FIGURES 2 and 3 corresponding items are given the same reference numerals in the two figures despite structural dissimilarities between the two arrangements.

The three piston assemblies 35, 5 and 5′ of FIGURE 2 take the form of a single piston assembly denoted 5 which has six stepped diameters co-operating with six corresponding bore diameters in a single body denoted 1.

There are six cylinder spaces, 2, 3, 4, 2′, 3′ and 4′ communicating separately via outlets 12, 13, 14, 12′, 13′ and 14′ with the six roller actuators.

A common cylinder space 39 communicates via inlet 41 with the source of pressurised ratio control fluid.

If any roller undergoes a tangential shift displacement in the absence of corresponding displacements by all the other rollers, either fluid must be forced through the restrictors to equalise the pressures in the cylinder spaces, or piston assembly 5 must move. In the latter case, the actuators associated with the said other rollers undergo adjustment of the fluid pressures applied to them tending to make other rollers undergo tangential shift displacements similar to that undergone by the said one roller. Similarly if three rollers of a set undergo in unison, tangential displacements not undergone by the three rollers of the other set, the pressures will be changed in three of the cylinder spaces 12, 13, 14, 12′, 13′, 14′ and pressure conditions will be altered in the others of those cylinder spaces leading to a pressure equalising damped flow of fluid through the restrictors, or to a movement of piston assembly 5 tending to make the three rollers of the said other set execute tangential shift displacements in unison with the said one set of rollers.

It is not of course essential that the cylinder spaces should be in the form of concentric bores of different diameters; a number of separate bores of the same size co-operating with a piston assembly having a number of identical plungers anchored together mechanically, may be used.

Such an arrangement is illustrated in FIGURES 4, 5, 6 and 7. FIGURE 4 is a section through the damper unit. A piston assembly 60 comprises a central interconnecting body 61 to which are securely fixed the centre parts of a number of cylindrical plungers of which two, 62 and 63, are shown. Two plungers are provided for each roller and they are arranged with their axes parallel to and equidistant from a central axis. The plungers are in diametrically opposite pairs and extend in both directions from body 61, having the same diameter at each end.

Two identical cylinder blocks 64 and 65 have cylinder bores of which two 66, 67 and 68, 69 are visible, arranged like the chamber of a revolver. Cylinder block 64 receives the upper extensions of the plungers and block 65 receives the lower extensions of the plungers.

A top cap 70 lies over block 64 and has a recess 71 interconnecting the upper ends of the bores of block 64 with a pressurised fluid entry passage 72. The lower ends of the bores of block 65 are interconnected together in diametrically opposite pairs, each pair being also connected to an exit passage, one of which, 73, is shown in FIGURE 4.

Figure 5:
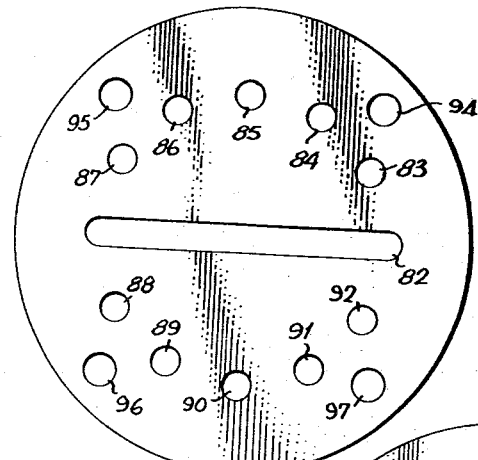
Figure 6:
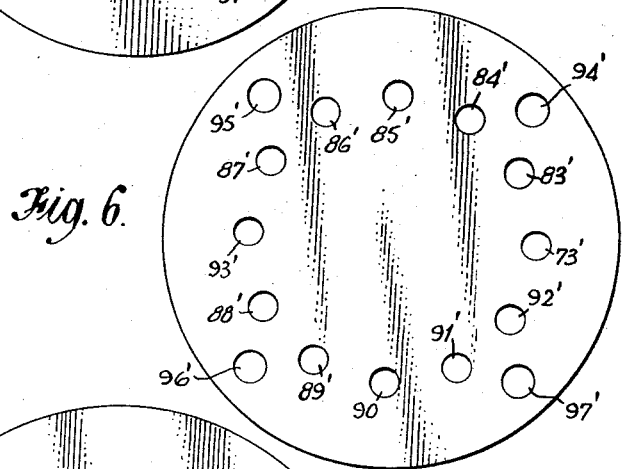

These interconnections may conveniently be achieved by means of a stack of punched laminations of two types illustrated in FIGURES 5 and 6 respectively. The FIGURE 5 lamination has one slot 82 running across a diameter and having a length sufficient to span two diametrically opposite bores of block 65; it also has 10 holes designated 83 to 92 inclusive, registering with the remaining bores of block 65. The FIGURE 6 lamination simply has a number of holes designated 83' to 92' inclusive and 73' and 93' registering with the said bores.

These laminations are stacked below block 65 with FIGURE 5 laminations sandwiched between FIGURE 6 laminations, the slots 82 of the FIGURE 5 laminations being oriented so that each interconnects a different pair of bores of block 65. Below the stack of laminations is a closing plate shown in FIGURE 7 which has six holes designated 91″, 92″, 73, 83″, 84″ and 85″, one hole for each pair of cylinder bores of block 65. The holes in FIGURE 5 and FIGURE 6 laminations provide a series of vertical passages one from each bore of block 65 and the slots of the FIGURE 5 laminations interconnect these passages in pairs. The FIGURE 7 closing plate blocks off the lower end of one passage leading from one bore of each pair and provide an outlet at the bottom of one of the passages from each pair of bores.

The FIGURE 5 and FIGURE 6 laminations can be punched out of sheet metal, the surfaces of which are preferably ground flat after punching so as to minimise leakage between mating surfaces. A certain amount of such leakage can be tolerated however as it combines with leakage past the plungers to provide restrictive interconnections between cylinder spaces associated with the roller actuators.

The arrangement described is intended to be the equivalent of FIGURE 3; it has twelve plungers co-operating with twelve bores in each of the cylinder blocks 64 and 65.

The assembly is completed by an outer barrel 74 having a central spacing flange 75 which holds blocks 64 and 65 apart to an extent sufficient to accommodate the plunger interconnecting body 61 with freedom of axial movement such as to allow the plungers to move up and down in the bores of blocks 64 and 65.

Figure 7:
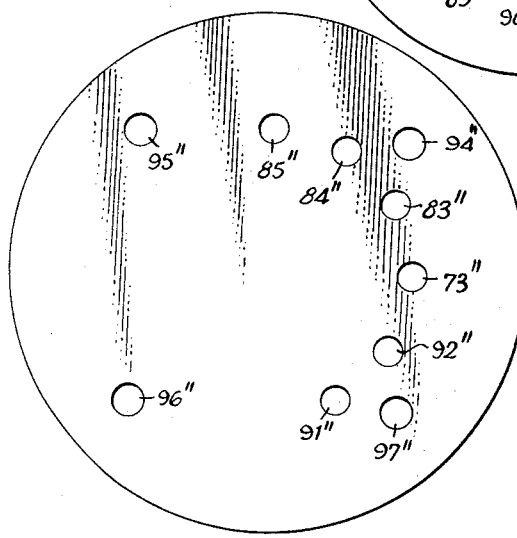

Bolts such as 76, 77 clamp the assembly together and additional holes 94, 95, 96, 97 and 94', 95', 96', 97' and 94″, 95″, 96″, 97″ are provided in the plates of FIGURES 5 and 6 and 7 respectively to accommodate four such bolts. Each of the six outlets, such as 73, is connected to a roller actuator so that the cylinder space associated with each roller actuator consists of two identical diametrically opposite bores in block 65. If, in course of operation of the damper unit, one roller actuator individually undergoes a change of pressure two diametrically opposite plungers such as 62 and 63 are subjected to an axial force which is balanced so that there is no tendency for the plunger assembly to tilt and jam.

All 12 of the upper extensions of the piston assembly are in communication via the recess 71 and together form a common cylinder space having the same effective piston area as the aggregate of the individual cylinder spaces with which the roller actuators communicate.

The restrictive passages which interconnect the cylinder spaces can take the form of the leakages between the plungers and the bores. The leakage path past each plunger leads to the central space 78 between blocks 64 and 65 which is the equivalent of gallery 19 in FIGURE 1.

Springs 79–80 normally urge the piston assembly with light force, to a central position and are the equivalent of springs 25 and 26 of FIGURE 1.

FIGURE 8 is a perspective sketch of the piston assembly which may be a light alloy die casting.

Interconnecting body 61 is preferably pierced with holes such as 81 to minimise resistance to its movement up and down the fluid-filled central space 78.

Hitherto reference has been made only to a single actuator for positioning each roller. Such an arrangement is adequate in a transmission unit which is not subjected to torque reversal. In many applications however, particularly vehicle installations, torque reversal is encountered and it is necessary to provide two actuators or a double acting actuator for opposing torque reactions which may urge a roller to execute tangential shift displacement in either direction. The servo control system for such a transmission unit has two interrelated fluid pressure supply sources and maintains a pressure difference between them which is related in degree and sign to the torque to which the transmission unit is subjected.

It is not necessary to provide damping units for both sets of roller actuators since a given actuator for a roller will displace fluid as between itself and a damping unit when the roller executes a tangential shift displacement without regard to the initiating cause for such displacement.

Figure 9:
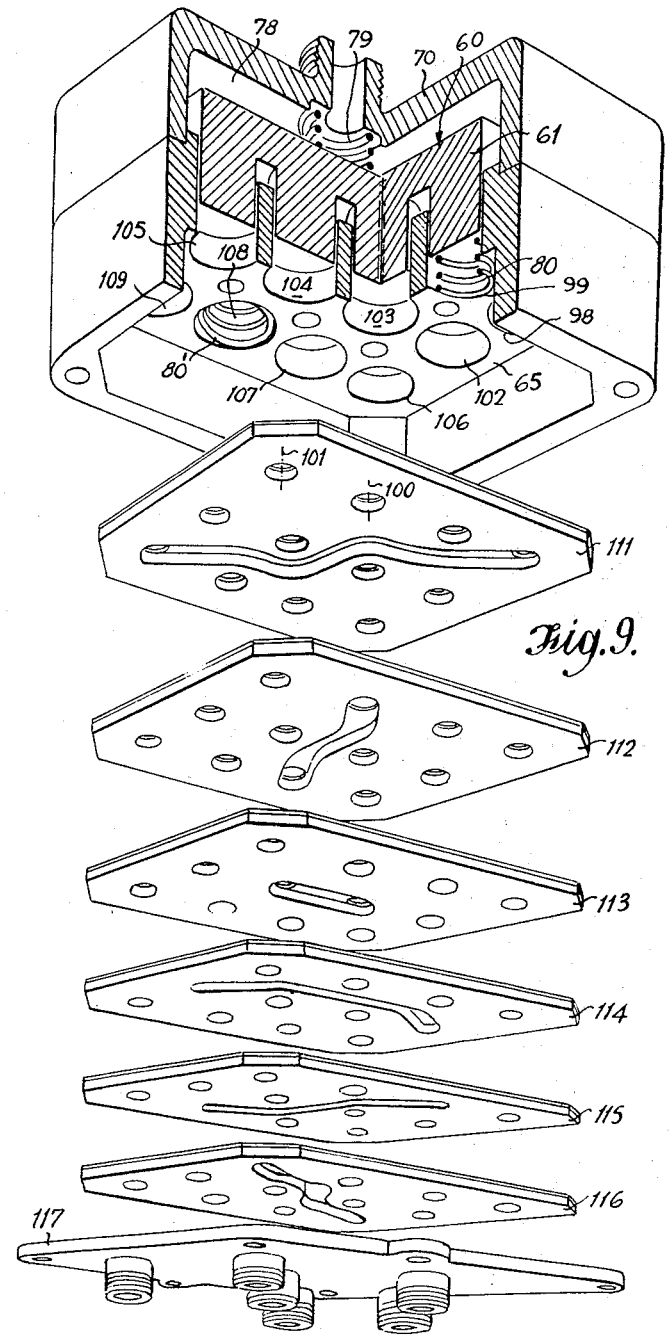

A simplified arrangement similar to that illustrated in FIGURES 4 to 8 is illustrated in FIGURE 9. In principle this can be regarded as the arrangement of FIGURES 4 to 8 with the top part of the piston assembly 60 and the upper block 64 removed. Furthermore, the 12 cylinder spaces instead of being disposed in a circle like the chambers of a revolver are more compactly disposed in three rows of four. To facilitate comparison between FIGURES 4 to 8 and FIGURE 9, the same reference numerals are used, where applicable, to denote corresponding items.

It will be seen from FIGURE 9, which is a sectioned and exploded perspective drawing of the damper unit that the cylinder spaces 98 to 109 inclusive are symmetrically disposed about a central point 110 so that they can be connected together in pairs: 98/109; 100/107; 103/104; 102/105; 99/108; 100/107; the line joining the centres of the members of each pair passing through the centre point 110, the cylinder spaces of the pair being equidistant from that centre point.

As cylinder spaces 100 and 101 are not shown, due to the sectioning in the drawing, these numerals are set against the dotted lines representing the respective centre lines of those cylinder spaces, produced below block 65. Conveniently the spring 80 of FIGURE 4 takes the form of two springs 80 and 80' disposed in the respective cylinder spaces of any chosen pair. The upper spring 79 bears against the lower surface of the top plate 70. The interconnection of a pair of cylinder spaces is arranged on the same principle as shown in FIGURES 4, 5, 6 and 7, but the laminations or plates designated 111, 112, 113, 114, 115, and 116, are drilled and slotted in an appropriately different way to interconnect 12 cylinder spaces arranged in three rows of four. In fact, only 4 different plate types are required i.e. 111, 112, 113, and 114, since a plate like 111 can be inverted to form a plate like 116 and a plate like 112 can be inverted to form a plate like 115. Each of these plates has a slot interconnecting the members of a pair of cylinder spaces plus 10 additional holes registering with the remaining cylinder spaces so that for each cylinder space there is a continuous passage from the lower side of the block 65 down to the bottom plate 117 (which is the equivalent of the plate of FIGURE 7). The bottom plate 117 is provided with six apertures adapted for connection to the roller positioning actuators for the six rollers and each of these apertures is in register with the vertical passage through the stack of plates 111-116 appertaining to one member of a pair of cylinder spaces, the vertical passage from the other member of each pair being blanked off by plate 117. Conveniently these outlets from plate 117 are in register with cylinder spaces 109, 107, 104, 102, 99, and 101, so that they have the maximum possible space between them to facilitate the accommodation of pipe unions if these are required.

The piston assembly 60 consists of 12 cylindrical plungers which register with and enter cylinder spaces 98-109 and they are mechanically coupled together by a top plate 61 which is preferably pierced with holes in the spaces between the plungers to facilitate the flow of fluid leaking through the cylinder spaces past the plungers to and from the common upper chamber 78, and to avoid the damping of up and down movements of the piston assembly in the course of rapid ratio changes.

The effective piston area of the piston assembly 60, upon which acts the pressure in the upper chamber 78, is equal to the combined areas of the plungers irrespective of the shape of the space 78 and the top plate 61.

As in the case of the embodiment illustrated in FIGURES 4 to 8, the plungers of the piston assembly 60 fit loosely in their cylinder spaces 98-109 so that the restrictive passages corresponding to 16-17-18-16'-17'-18' of FIGURE 3 take the form of leakage paths between the plungers and the cylinder spaces. It will be noted that there is no individual restrictive passage corresponding to restrictor 15 of FIGURE 1, restrictors 45, 15 and 15' of FIGURE 2, restrictor 45 of FIGURE 3, nor the leakage paths between the upper plungers of the piston assembly 60 and the cylinder spaces such as 66-67 in top plate 64 in FIGURE 4. This however, does not materially affect the performance of the damping unit because a tangential shift on the part of one roller independently of the others can only take place by forcing fluid past the plungers in the pair of cylinder spaces associated with that roller and, in series, through the leakage spaces between all the other plungers and their associated cylinder spaces.

This is not affected by the fact that the leakage flow to or from the actuator of the individually displaced roller passes first into or out of the common upper cylinder space 78 and thence from or to the actuators of the other rollers. The effect of an individual restrictor between the common cylinder space and the restrictive passages individual to the cylinder spaces associated with the rollers is only manifest in relation to the performance of the device when the ratio changes are taking place on the part of the rollers together. When this change is sudden, as previously described, the piston assembly moves as a whole and gradually centres itself by reason of the springs 79-80 when a stable ratio is established. This restoration of the piston assembly involves the flow of fluid through the restrictive passages associated with individual roller actuators but as these restrictive passages are all in parallel with one another, the damping applied to the piston assembly delaying the centering thereof by the springs is very much less than the damping resisting tangential shift of one roller independently of the other rollers. The use of an individual restrictor such as 15, 45, between the common cylinder space and the individual restrictors enables the centering of the piston to be controlled independently of the performance of the damping device in relation to non-synchronous motions of the rollers. If this is not required the restrictor 15 of FIGURE 1, the restrictors 45, 15, 15' of FIGURE 2, restrictor 45 of FIGURE 3, are not required and in FIGURE 4 the upper chamber 71 and the intermediate chamber 78 could be interconnected by drilling a hole through the middle of upper block 64.

The dimensions of the plungers and cylinder spaces in the arrangement of FIGURE 9 are governed by the necessity that the piston assembly 61 must not reach the extremes of its range of motion in the course of a sudden tangential shift from one extreme to the other on the part of the rollers, hence the aggregate swept volume of the cylinder spaces 98-109 must be greater than the aggregate swept volume of the roller positioning actuators. This permits the characteristics of the restrictive passages formed between the plungers and the cylinder spaces to be adjusted by a suitable choice of stroke-to-bore ratio of the cylinder spaces 98-109 so long as they are given the necessary total swept volume as indicated above.

The description of the invention has thus far related to embodiments in which pistons move axially within parallel bores. It is to be understood that equivalent devices fall within the scope of the invention, and the expressions "cylinder space" and "piston element" are intended to embrace the corresponding elements of such equivalent devices.

For instance, diaphragms may be used as "piston elements" to displace fluid into or out of chambers of which the diaphragms form walls, such chambers being considered as "cylinder spaces." A plurality of diaphragms would be coupled at their centres to a common "spider" element so that motion of one diaphragm would cause motion of the others in the same direction. It is envizaged that an arrangement of diaphragms would take a form analogous to that of FIGURE 9.

Another alternative construction would take the form similar to that of a rotary fluid pressure actuator of the type having a rotor with a plurality of radial vanes, mounted for rotation in a cylindrical space within a casing having a like plurality of stationary vanes extending radially inwards towards, and closely approaching, a central hub of the rotor, so as to define spaces on either side of each rotor vane. Every alternate space would be individual to a rotor actuator and the remaining spaces would be interconnected, to form the common cylinder space.

There would be no need to seal the sides and ends of the vanes, which could be a normal running fit, since any leakage could be utilised to furnish the flow restrictors in the same way as obtains in the case of the pistons and cylinders of the arrangement shown in FIGURE 9.

The invention has been described for ease of illustration in relation to a toroidal race transmission unit having the roller centres substantially on the torus centre. It is not however confined to this particular type of transmission unit, for instance it is equally suitable for use with a toroidal race transmission unit having the roller centres substantially inset from the torus centre circle. That type of transmission unit, where the rollers undergo tangential shift displacement under control of individual fluid pressure operated actuators which support the torque reactions to which the rollers are subjected, is well known.

The invention is furthermore applicable for use with any hydraulic actuator assembly where actuators are operated in parallel from a common source of fluid under controllable pressure and where it is required to damp any action of an actuator not accompanied by similar action of all actuators but to leave undamped the actions which the actuators make together in unison. The considerations governing the total swept volume of the cylinder spaces to be connected to the individual actuators are as follows:

Where a sudden change of the control pressure or of the load applied to an actuator is liable to involve a full excursion from one end to the other of its range of action, the swept volume of the cylinder space of the damping unit associated with that actuator must be twice the total swept volume of the actuator since at the inception of such change of control pressure or change of load, the actuator may be at one end of its range of action and be required to move to the other end of its range, whereas the piston assembly will in general be at the mid-stroke position to which it is resiliently biassed. If the cylinder spaces of the damping unit have a smaller swept volume than this, unison movements of the actuator will be damped when the piston assembly reaches the end of its stroke. There will be applications however in which such sudden changes of control pressure or load will only be of an amplitude involving small movements of the actuators and in which a smaller swept volume for the individual cylinder spaces of the damping unit can be tolerated.

In this context it should be noted that the use of the invention is not necessarily confined to applications where the actuators are of limited stroke. In the extreme case of rotary actuators of infinite stroke, for instance, so long as the cylinder spaces of the damping unit are large enough for it to respond to sudden changes of control pressure or load without the piston elements reaching the end of their strokes, that is to say, when the sudden changes are of relatively small amplitude, any slow steady flow of fluid can pass to the actuators through the restrictors without moving the piston assembly appreciably from its biased mid-stroke position.

I claim:

1. A damping unit for use with a plurality of fluid-pressure-operated actuators coupled in parallel to a common source of fluid under pressure capable of control characterised in that the damping unit comprises a plurality of cylinder spaces each adapted for connection to, one of the actuators, a piston assembly having mechanically interconnected piston units one movable in each cylinder space so that the effective piston areas of the piston units in their respective cylinder spaces are equal one with another, a common cylinder space adapted for connection to the said common fluid pressure source, displacement means integral with the piston assembly and adapted, on movement of the piston assembly to change the volume of the common cylinder space by an amount equal and in opposite sense to the aggregate of the changes which take place within the said plurality of cylinder spaces as a result of such movements of the piston assembly, resilient means lightly biassing the piston assembly to an intermediate position between the extreme limits of its permissible motion within the cylinder spaces and a fluid connection comprising at least one passage restrictive of fluid flow, between each cylinder space and each of the other cylinder spaces.

2. A damping unit for a transmission unit of the type in which rollers provide a driving connection respectively between facing toroidal surfaces of an input disc and an output disc mounted for rotation about a common main axis and in which the rollers are mounted with freedom of movement of a first character permitting the diameters of the discs with which the rollers make contact, to be varied so as to vary the transmission ratio of the transmission unit and with freedom of movement also of a second character whereby the rotational axes of the rollers depart from the stable equilibrium attitude where the said roller axes intersect the main axis, so that the rollers steer themselves from one ratio attitude to another ratio attitude, mountings for the rollers comprising an individual fluid pressure actuator for each roller arranged to resist the torque reaction to which the roller is subjected and to control motions of the second character on the part of the roller a common source of fluid under pressure and connections therefrom to the individual roller actuators and means for varying the pressure delivered from the source to initiate variations in the ratio of the transmission unit, characterised in that the damping unit is adapted for insertion in the path of fluid flow between the said source and the roller actuator such damping unit comprising a cylinder space individual to and adapted for connection to each roller actuator, a piston assembly having mechanically interconnected piston units one movable in each cylinder space so that the effective piston areas of the piston units in their respective cylinder spaces are equal one with another, a common cylinder space adapted for connection to the said pressure fluid source, displacement means integral with the piston assembly and adapted on movement of the piston assembly to change the volume of the common cylinder space by an amount equal and in the opposite sense to the aggregate of the changes which take place within the cylinder spaces individual to the roller actuators as a result of such movements of the piston assembly, resilient means lightly biassing the piston assembly to an intermediate position between the extreme limits of its permissable motion within the cylinder spaces and a fluid connection comprising at least one passage restrictive of fluid flow between each cylinder space and each of the other cylinder spaces.

3. A damping unit as claimed in claim 1 in which the damping unit comprises a body having a number of stepped bores of decreasing diameter extending along a common axis and in which the piston assembly has a number of correspondingly stepped diameters to define one circular piston-cylinder combination at the smallest diameter and annular piston-cylinder combinations at the other diameters all the piston-cylinder assemblies having effectively equal bores, the largest diameter of the piston assembly, at its face remote from the said circular piston-cylinder assembly, forming the said displacement means and co-operating with the largest of the said bores to form the said common cylinder space.

4. A damping unit as claimed in claim 3 in which each of them, the said annular piston-cylinder combinations and the said circular piston-cylinder combination, is connected through a separate passage, restrictive to the flow of fluid therethrough, with a channel in communication with the common cylinder space.

5. An assembly of damping units of the type claimed in claim 1, adapted for use with a plurality of sets of fluid pressure operated actuators all coupled in parallel to the common source of fluid under pressure in which one of the said damping units is provided for each of the said sets of actuators and has one of the said cylinder spaces for each of the actuators of the set and another of the said damping units having one of the said cylinder spaces for and connected to the common cylinder space of each of the damping units provided for the sets of actuators, the common cylinder space of the said other damping unit, being adapted for connection to the said common source of fluid under pressure.

6. A damping unit as claimed in claim 2, for a transmission unit having sets of rollers forming two driving connections, effectively in parallel, between two outer inwardly facing toroidal disc surfaces and two central outwardly facing toroidal disc surfaces, with one of the said damping units individual to each set of rollers and a common damping unit of similar type with a common cylinder space, and two other cylinder spaces one associated with and connected to the common cylinder spaces of each of the said individual damping units, the pressure fluid source being connected to the common cylinder space of the common damping unit.

7. A damping unit as claimed in claim 1 in which each cylinder space of the damping unit communicates with a common passage, such communication being effected for each of the cylinder spaces, through a separate fluid flow restrictive passage individual to that cylinder space, except in the case of the common cylinder space which is in direct communication with the common passage.

8. A damping unit as claimed in claim 1 in which the cylinder spaces other than the common cylinder space take the form of pairs of parallel cylindrical bores in a cylinder body, the said bores being arranged in a pattern such that the two members of each pair are symmetrically disposed about a central point common to all the pairs the two members of each being in communication with each other and together adapted for connection to a single actuator in which the piston assembly comprises an array of parallel cylindrical piston elements of equal diameters one end of each piston element being attached to a common support element in a manner such that the piston elements form a piston assembly registering with the cylinder spaces whereby free ends of the piston elements may enter and slide freely in the cylinder spaces, with a cover surrounding the common support element and sealed to the cylinder body leaving a space around the common support element and the ends of the piston elements where they protrude from the cylinder bores, to form the common cylinder space.

9. A damping unit as claimed in claim 8 in which a second set of piston elements identical in diameter and arrangement with the first set of piston elements, extend from the side of the common support element remote from first set of piston elements in which a second cylinder body having cylinder bores identical in diameter and arrangement with those of the first cylinder body receives the second piston elements and in which a second cover surrounds the open ends of the bores of the second cylinder body and is sealed to the latter whereby the space within the second cover, rather than the space within the first cover forms the common cylinder space.

10. A damping unit as claimed in claim 8 in which the piston elements are received in the cylindrical bores of the cylinder body with clearance, to form the said passages restrictive of fluid flow.

11. A damping unit as claimed in claim 8 in which the connections from the cylinder spaces other than the common cylinder space are provided by means of a stack of plates each having an array of holes registering with the individual bores of the first cylinder body so as to form an array of continuous holes extending from the cylinder spaces through the thickness of the stack each plate having a slot interconnecting the two holes corresponding to one pair of bores in the first cylinder body, a different pair for each plate, the slots not communicating with any of the holes in the plate except those which it interconnects, a closure plate covering the face of the stack of plates at the end thereof remote from the first cylinder body and closing one continuous hole of each pair corresponding to a pair of cylinder spaces and comprising means for connecting the other continuous hole of each said pair to one of the said actuators.

References Cited

UNITED STATES PATENTS

| | | | |
|---|---|---|---|
| 3,048,047 | 8/1962 | Richardson | 74—200 |
| 3,153,938 | 10/1964 | Perry | 74—200 |
| 3,276,279 | 10/1966 | Perry et al. | 74—190.5 |

FRED C. MATTERN, JR., *Primary Examiner.*

C. J. HUSAR, *Assistant Examiner.*